US011307977B2

(12) United States Patent
Khan et al.

(10) Patent No.: US 11,307,977 B2
(45) Date of Patent: Apr. 19, 2022

(54) TECHNOLOGIES FOR DIRECT MATRIX READ AND WRITE OPERATIONS

(71) Applicant: Intel Corporation, Santa Clara, CA (US)

(72) Inventors: Jawad B. Khan, Portland, OR (US); Richard Coulson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/144,459

(22) Filed: Sep. 27, 2018

(65) Prior Publication Data

US 2019/0042401 A1 Feb. 7, 2019

(51) Int. Cl.
  *G06F 12/02* (2006.01)
  *G06F 3/06* (2006.01)
  *G06F 15/78* (2006.01)

(52) U.S. Cl.
  CPC ........ *G06F 12/0207* (2013.01); *G06F 3/0608* (2013.01); *G06F 3/0611* (2013.01); *G06F 3/0634* (2013.01); *G06F 3/0638* (2013.01); *G06F 3/0673* (2013.01); *G06F 3/0683* (2013.01); *G06F 15/7821* (2013.01); *G06F 2212/1024* (2013.01)

(58) Field of Classification Search
  CPC .. G06F 12/0207; G06F 3/0611; G06F 3/0638; G06F 3/0683; G06F 15/7821; G06F 2212/1024; G06F 3/0608; G06F 3/0634; G06F 3/0673
  See application file for complete search history.

(56) References Cited

U.S. PATENT DOCUMENTS

| | | | | |
|---|---|---|---|---|
| 3,800,289 | A * | 3/1974 | Batcher | G06F 12/0207 711/104 |
| 4,740,927 | A * | 4/1988 | Baker | G06F 12/0207 345/572 |
| 5,875,479 | A * | 2/1999 | Blount | G06F 11/1466 711/112 |
| 7,861,060 | B1 * | 12/2010 | Nickolls | G06F 9/3887 712/22 |
| 8,359,586 | B1 * | 1/2013 | Orofino, II | G06F 8/30 717/152 |

(Continued)

OTHER PUBLICATIONS

Stack Overflow; Row-major vs Column-major confusion (Year: 2015).*

(Continued)

*Primary Examiner* — Paul M Knight
(74) *Attorney, Agent, or Firm* — Compass IP Law, PC

(57) ABSTRACT

Technologies for directly performing read and write operations on matrix data in a data storage device are disclosed. The data storage device receives a request to perform a read or write operation on matrix data stored in one or more memory units of the data storage device. Each memory unit is associated with a column address for the matrix data. The data storage device determines whether the request specifies to read or write a column or a row in the matrix data. The data storage device performs, in response to a determination that the request specifies to read or write a column in the matrix data, the read or write operation on the matrix data on the column.

18 Claims, 6 Drawing Sheets

(56) References Cited

U.S. PATENT DOCUMENTS

| | | | | |
|---|---|---|---|---|
| 2004/0128136 | A1* | 7/2004 | Irani | H04M 3/4938 |
| | | | | 704/270.1 |
| 2011/0016268 | A1* | 1/2011 | Qawami | G06F 12/0804 |
| | | | | 711/105 |
| 2014/0082322 | A1* | 3/2014 | Loh | G06F 12/00 |
| | | | | 711/202 |
| 2015/0186286 | A1* | 7/2015 | Kass | G06F 12/0875 |
| | | | | 711/134 |
| 2018/0081939 | A1* | 3/2018 | Hopeman | G06F 16/221 |
| 2018/0246855 | A1* | 8/2018 | Redfern | G06F 17/16 |
| 2019/0043553 | A1* | 2/2019 | Chang | G11C 7/109 |
| 2020/0034306 | A1* | 1/2020 | Luo | G06F 12/0207 |

OTHER PUBLICATIONS

Stack Overflow Are python lists row-major ordered or column-major ordered? by SheepCow (Year: 2017).*
Intel & Micron 3D XPoint memory—is it just CBRAM hyped up? by Jennings; Computerworld (Year: 2015).*
Just One Thousand times Better than FLASH by Mellor (Year: 2015).*
Intel® 3D XPoint™ Trademark Usage Guidelines (Year: 2021).*
Python 201: What are descriptors? by Mike (Wayback) (Year: 2016).*
180 SRAM by Coen 2004 (Year: 2004).*

* cited by examiner

TECHNOLOGIES FOR DIRECT MATRIX READ AND WRITE OPERATIONS

BACKGROUND

Matrix operations have multiple applications in various settings, such as in the fields of artificial intelligence and machine learning. For example, machine learning algorithms frequently include matrix multiply and accumulate (MAC) operations. Performing a matrix multiplication involves reading a given matrix in row-major form, reading another matrix in column-major form, and multiplying the respective rows and columns with one another. Often, a compute device may store matrices in either row-major or column-major form and convert the matrix as needed during an operation. However, doing so increases latency and computational cost. As an alternative, a matrix may be stored in both row-major and column-major forms, but doing so increases memory usage.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
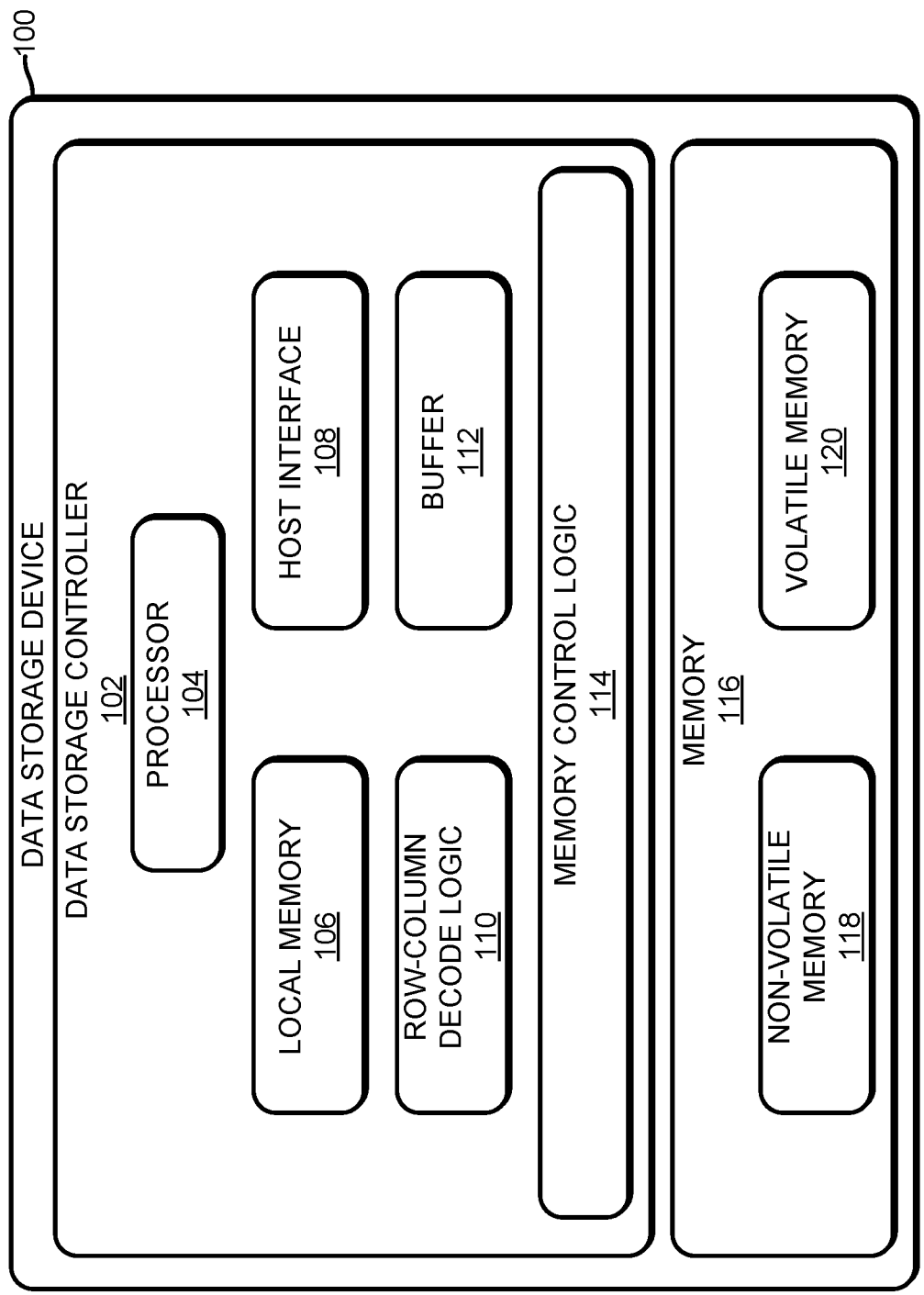
FIG. 1 is a simplified block diagram of at least one embodiment of an example data storage device to provide flexible memory addressability for matrix read and write operations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data storage device 100 to provide flexible memory addressability for matrix read and write operations is shown. In the illustrative embodiment, the data storage device 100 includes a data storage controller 102 and a memory 116. The data storage controller 102 is generally to receive a request to perform a read or write operation on matrix data stored in one or more memory units of the memory 116, determine whether the request specifies to read or write a column or a row in the matrix data, and perform, in response to a determination that the request specifies to read or write a column (or row) in the matrix data, the read or write operation on the column (or row). The data storage device 100 may be embodied as any type of device capable of storing data and performing the functions described herein. For instance, the data storage device 100 may be a crosspoint memory-based data storage device, such as a three-dimensional (3D) crosspoint device. In some embodiments, bit addressability may be enabled in such devices, which allows the data storage device 100 to access stored data by bit (e.g., in contrast to accessing a block address in NAND-based storage devices or a page in DRAM-based storage devices) may efficiently read and write matrix data in row- or column-major form without needing to perform any further manipulations to the data (e.g., converting a stored row-major matrix to column-major form, storing a matrix data as two separate matrices each with a respective row- and column-major form, and the like). Advantageously, doing so may increase performance of operations performed on matrices stored in the data storage device 100 and compute devices that are configured with the data storage device 100.

The data storage controller 102 may be embodied as any type of control device, circuitry or collection of hardware devices capable of providing the flexible addressability for matrix data disclosed herein. In the illustrative embodiment, the data storage controller 102 includes a processor (or processing circuitry) 104, a local memory 106, a host interface 108, a row-column decode logic 110, a buffer 112, and a memory control logic 114. The memory control logic 114 can be in the same die or integrated circuit as the processor 104 and the memory 106 and 116. In some cases, the processor 104, memory control logic 114, and the memory 106 and 116 can be implemented in a single die or integrated circuit. Of course, the data storage controller 102 may include additional devices, circuits, and/or components commonly found in a drive controller of a crosspoint memory-based data storage device in other embodiments.

The processor 104 may be embodied as any type of processor capable of performing the functions disclosed herein. For example, the processor 104 may be embodied as a single or multi-core processor(s), digital signal processor, microcontroller, or other processor or processing/controlling circuit. Similarly, the local memory 106 may be embodied as any type of volatile and/or non-volatile memory or data storage capable of performing the functions disclosed herein. In the illustrative embodiment, the local memory 106 stores firmware and/or instructions executable by the processor 104 to perform the described functions of the data storage controller 102. In some embodiments, the processor 104 and the local memory 106 may form a portion of a System-on-a-Chip (SoC) and be incorporated, along with other components of the data storage controller 102, onto a single integrated circuit chip.

The host interface 108 may also be embodied as any type of hardware processor, processing circuitry, input/output circuitry, and/or collection of components capable of facilitating communication of the data storage device 100 with a host device or service (e.g., a host application). That is, the host interface 108 embodies or establishes an interface for accessing data stored on the data storage device 100 (e.g., stored in the memory 116). To do so, the host interface 108 may be configured to use any suitable communication protocol and/or technology to facilitate communications with the data storage device 100 depending on the type of data storage device. For example, the host interface 108 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

The row-column decode logic 110 may be embodied as any device (e.g., a controller, a processor, dedicated circuitry, etc.) capable of performing operations to provide row and column addressability for memory units in a memory array of the memory 116. More particularly, each memory unit may be associated with a given amount of bits, in which each bit is associated with an address. Further, each memory unit itself may be associated with a bit. Such a bit granularity allows a memory unit to have row and column addressability. The row-column decode logic 110, in evaluating a matrix by either row- or column, may apply either a row- or column-decoding technique on each memory unit based on how the matrix is stored (e.g., whether the matrix data is stored in row-major or column-major format).

In some embodiments, the row-column decode logic 110 may include circuitry to evaluate a descriptor for each matrix (e.g., generated by a host device) that provides attributes associated with a matrix that is stored in the memory 116. For example, the descriptor may include dimensions associated with the matrix, a size of each element in the matrix, whether the matrix is stored in row-major or column-major format, and a number and list of locations in the memory 116 in which the matrix is stored. The row-column decode logic 110 may evaluate the matrix descriptor in performing a read or write operation on the associated matrix.

The buffer 112 of the data storage controller 102 is embodied as volatile memory used by data storage controller 102 to temporarily store data that is being read from or written to the memory 316, such as matrix data. The particular size of the buffer 112 may depend on a total storage size of the memory 116. The memory control logic 114 is illustratively embodied as hardware circuitry and/or device configured to control the read/write access to data at particular storage locations of memory 116.

In the illustrative embodiment, the memory 116 includes a non-volatile memory 119 and volatile memory 120. The non-volatile memory 118 may be embodied as any type of data storage capable of storing data in a persistent manner (even if power is interrupted to non-volatile memory 118). For example, in the illustrative embodiment, the non-volatile memory 118 is embodied as one or more non-volatile memory devices. The non-volatile memory devices of the non-volatile memory 118 include one or more memory devices configured in a cross-point architecture that enables bit-level addressability (e.g., the ability to read from and/or write to individual bits of data, rather than bytes or other larger units of data), and are illustratively embodied as three-dimensional (3D) crosspoint memory. In some embodiments, the non-volatile memory 118 may additionally include other types of memory, including any combination of memory devices that use chalcogenide phase change material (e.g., chalcogenide glass), ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM.

The volatile memory 120 may be embodied as any type of data storage capable of storing data while power is supplied volatile memory 120. For example, in the illustrative embodiment, the volatile memory 120 is embodied as one or more volatile memory devices, and is periodically referred to hereinafter as volatile memory 120 with the understanding that the volatile memory 120 may be embodied as other types of non-persistent data storage in other embodiments. The volatile memory devices of the volatile memory 120 are illustratively embodied as dynamic random-access memory (DRAM) devices, but may be embodied as other types of volatile memory devices and/or memory technologies capable of storing data while power is supplied to the volatile memory 120.

Figure 2:
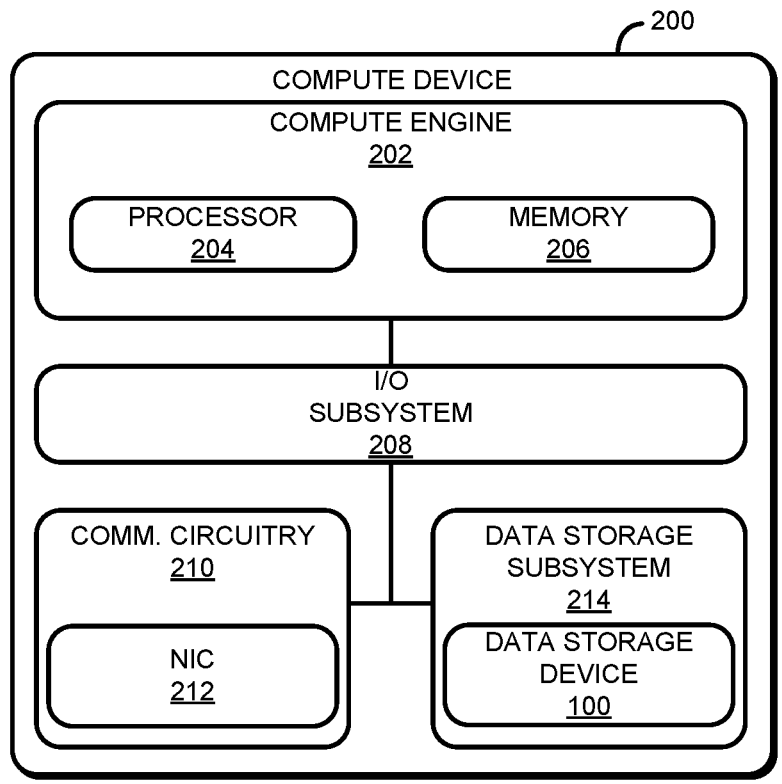
FIG. 2 is a simplified block diagram of at least one embodiment of a compute device that may be configured with the data storage device described relative to FIG. 1.

Referring now to FIG. 2, the compute device 200 may be embodied as any type of device capable of performing the functions described herein. For example, the compute device 200 is representative of a physical compute device configured to provide processing resources for one or more workloads. For instance, workloads may include compute intensive algorithms, such as machine learning, artificial intelligence, and deep learning techniques. Such workloads may perform a number of matrix operations that can be improved upon using the flexible addressing techniques disclosed herein. In other embodiments, the compute device 200 is representative of a virtual computing instance in the cloud, and the hardware components described relative to FIG. 2 are virtualized components.

As shown, the illustrative compute device 200 includes a compute engine 202, an input/output (I/O) subsystem 208, communication circuitry 210, and a data storage subsystem 214. Of course, in other embodiments, the compute device 200 may include other or additional components, such as those commonly found in a computer (e.g., display, peripheral devices, etc.), such as peripheral devices. Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 206. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The memory 206 may be embodied as any type of volatile (e.g., dynamic random access memory, etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other bit addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 206 may be integrated into the processor 204. Further, in some embodiments, the row-column decode logic 110 may be included in the compute engine 202 and may perform the operations described herein on the memory 206 (e.g., in embodiments in which all or a portion of the memory 206 has a cross-point architecture that enables bit-level addressability, such as Intel 3D XPoint memory).

The compute engine 202 is communicatively coupled with other components of the computing device 102 via the I/O subsystem 208, which may be embodied as circuitry and/or components to facilitate input/output operations with the compute engine 202 (e.g., with the processor 204 and/or the memory 206) and other components of the compute device 200. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 208 may form a portion of a system-on-a-chip (SoC) and be incorporated, along with one or more of the processor 204, the memory 206, and other components of the compute device 200, into the compute engine 202.

The communication circuitry 210 may be embodied as any communication circuit, device, or collection thereof, capable of enabling communications over a network between the compute device 200 and other devices, such as compute nodes requesting matrix operations to be performed on matrix stored within the data storage device 100. The communication circuitry 210 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 210 includes a network interface controller (NIC) 212, which may also be referred to as a host fabric interface (HFI). The NIC 212 may be embodied as one or more add-in-boards, daughtercards, controller chips, chipsets, or other devices that may be used by the compute device 200 for network communications with remote devices. For example, the NIC 212 may be embodied as an expansion card coupled to the I/O subsystem 208 over an expansion bus such as PCI Express.

The data storage subsystem 214 may be embodied as any type of devices configured for short-term or long-term storage of data such as the data storage device 100. The data storage device 100 may be embodied as memory devices and circuits, solid state drives (SSDs), memory cards, hard disk drives, or other data storage devices. The illustrative data storage device 100 is embodied as one or more 3D crosspoint memory-based storage devices that provide flexible addressing for matrix operations. However, in other embodiments, the data storage device 100 may be embodied as or include any other memory devices capable of flexible addressability according to the functions disclosed herein.

Additionally or alternatively, the compute device 200 may include one or more peripheral devices. Such peripheral devices may include any type of peripheral device commonly found in a compute device such as a display, speakers, a mouse, a keyboard, and/or other input/output devices, interface devices, and/or other peripheral devices.

Figure 3:
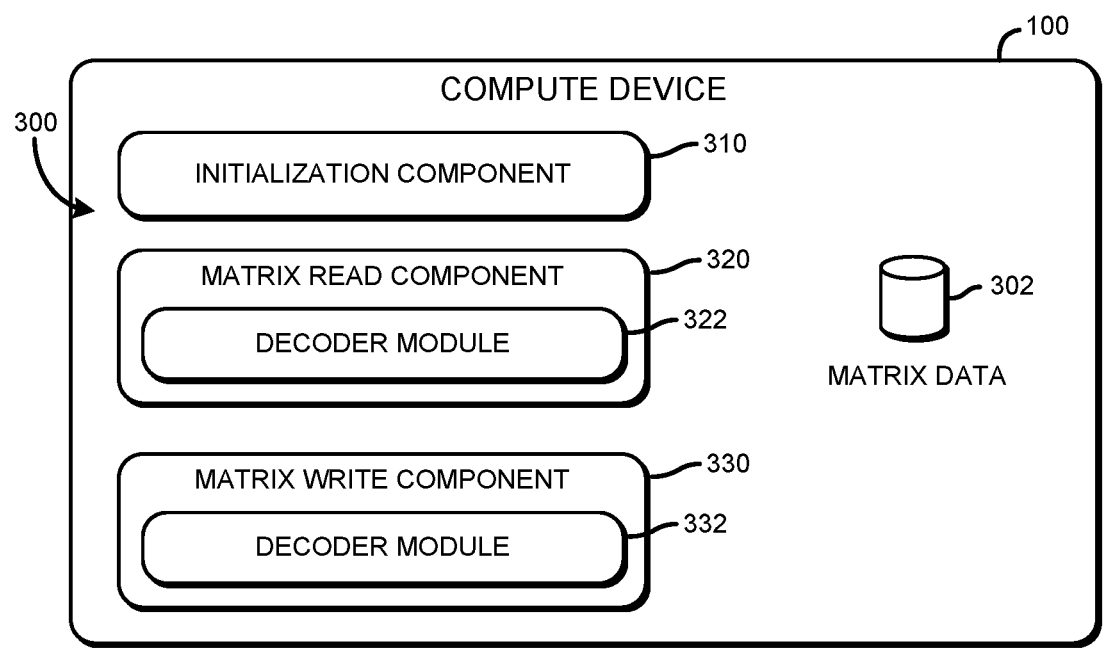
FIG. 3 is a simplified block diagram of at least one embodiment of an environment that may be established by the data storage controller described relative to FIG. 1.

Referring now to FIG. 3, the compute device 200 may establish an environment 300 during operation. The illustrative embodiment includes an initialization component 310, a matrix read component 320, and a matrix write component 330. Each of the components of the environment 300 may be embodied as hardware, firmware, software, or a combination thereof. Further, in some embodiments, one or more of the components of the environment 300 may be embodied as circuitry or a collection of electrical devices (e.g., initialization component circuitry 310, matrix read component circuitry 320, and matrix write component circuitry 330, etc.). It should be appreciated that, in some embodiments, one or more of the initialization component circuitry 310, matrix read component circuitry 320, and matrix write component circuitry 330 may form a portion of one or more of the components of the data storage controller 102, such as the processor 104, local memory 106, row-column decode logic 110, the memory control logic 114, and/or other components.

In the illustrative embodiment, the environment 300 also includes matrix data 302, which may be embodied as any data indicative of one or more matrices stored in memory of the data storage device 100 according to the techniques disclosed herein. Each matrix in the matrix data 302 may be stored in either row- or column-major format, in which each cell of the matrix is addressed by memory unit (or some specified granularity).

The initialization component 310, which may be embodied as hardware, firmware, software, virtualized hardware, emulated architecture, and/or a combination thereof as discussed above, is to initialize portions of the memory 116 in which to store matrix data 302. For example, the initialization component 310 may receive requests (e.g., via the host interface 108 from the compute device 200) to initialize the matrix data. Such requests may be formatted according to a matrix command format that allows a workload to specify attributes of the matrix, such as matrix dimensions, element size, and whether to store the matrix in row-major or column-major format. The initialization component 310 is also to allocate memory units for storage of the matrix data 302. In addition, the initialization component 310 is also to generate a matrix descriptor that includes the specified attributes of the matrix.

The matrix read component 320, which may be embodied as hardware, firmware, software, virtualized hardware, emulated architecture, and/or a combination thereof as discussed above, is to perform read operations on the matrix data 302. The matrix read component 320 may receive requests to perform the read operations on a specified portion of a given matrix. The request may be formatted according to a matrix command format that allows a workload (or other components of the compute device 200) to specify a start memory address of the matrix. The start memory address is indicative of the first location in which data associated with the specified matrix is stored. Further, the first location may also store a matrix descriptor associated with the matrix. Further still, the request may also include a row-major or a column-major flag that is indicative of whether to perform a row-major or a column-major readout of the matrix data. In addition, the request may also include an offset in the row or column from which to read. And further, the request may also include a total number of elements in the matrix to read. In some embodiments, if the total number of elements is larger than the row or column to read, the matrix read component 320 may automatically read the data for the next row or column. Further, the size of the element may be determined from the matrix descriptor stored in the first location.

The matrix read component 320 includes a decoder module 322 that is to determine whether the request specifies to read a row or a column in the matrix data 302, e.g., based on a flag in the request. The decoder module 322 may access the matrix data 302 based on the information provided in the request and apply row or column decoding logic to the requested row or column. For instance, if the matrix is stored in row-major format and the request specifies to read a column, the decoder module 322 may determine a column addressing for the matrix and perform the read operation based on the addressing and other attributes provided by the matrix descriptor associated with the matrix. The matrix read component 320 may also return the result of the read operation.

The matrix write component 330, which may be embodied as hardware, firmware, software, virtualized hardware, emulated architecture, and/or a combination thereof as discussed above, is to perform write operations on the matrix data 302. The matrix write component 320 may receive requests to perform the write operations on a specified portion of a given matrix, similar to the request described above relative to the matrix read component 320.

The matrix write component 330 includes a decoder module 332 that is to determine whether the request specifies to write a row or a column in the matrix data 302, e.g., based on a flag in the request. The decoder module 332 may access the matrix data 302 based on the information provided in the request and apply row or column decoding logic to the requested row or column, similar to the decoder module 322. The matrix write component 320 may also return the result of the write operation.

It should be appreciated that each of the initialization component 310, the matrix read component 320, and the matrix write component 330 may be separately embodied as hardware, firmware, software, virtualized hardware, emulated architecture, and/or a combination thereof. For example, the matrix read component 320 and the matrix write component 330 may be embodied as a hardware component, while the initialization component 310 is embodied as a virtualized hardware component or as some other combination of hardware, firmware, software, virtualized hardware, emulated architecture, and/or a combination thereof.

Figure 4:
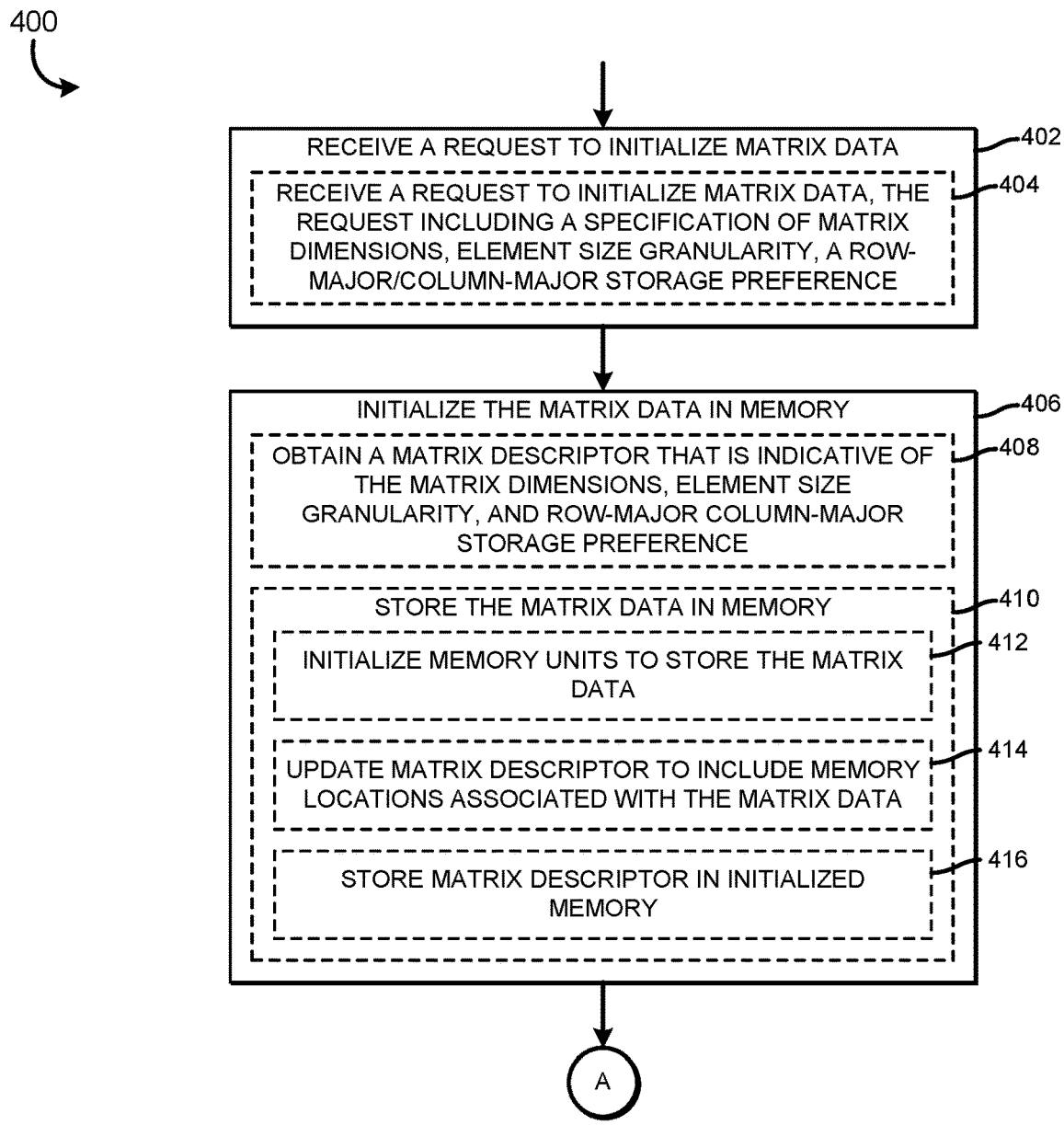
FIG. 4 is a simplified flow diagram of a method for initializing matrix data in the data storage device described relative to FIG. 1.

Referring now to FIG. 4, the data storage device 100, in operation, may perform a method 400 for initializing matrix data in memory. As shown, the method 400 begins in block 402, in which the data storage device 100 receives a request to initialize matrix data. More particularly, in block 404, the data storage device 100 receives a request that includes a specification of matrix dimensions, an element size granularity, and a row-major or column/major storage preference for the matrix data. The request may be received, for example, from a workload that performs matrix operations. The request may also be received generally from components in the compute device 200.

In block 406, the data storage device 100 initializes the matrix data. For instance, in block 408, the data storage device 100 may retrieve, from memory, a matrix descriptor (e.g., generated by the compute device 200) that is indicative of the matrix dimensions, element size granularity, and the row-major or column-major storage preference specified in the request. As stated, the matrix descriptor may be used by the data storage device 100 in performing read or write operations on the matrix data following initialization.

In block 410, the data storage device 100 stores the matrix data in memory according to the specified storage preference. More particularly, in block 412, the data storage device 100 initializes the memory units to store the matrix data based on the attributes specified in the request. Further, in block 414, the data storage device 100 updates the matrix descriptor to include locations of the initialized memory units that are associated with the matrix data. Further still, in block 416, the data storage device 100 stores the matrix descriptor in the initialized memory. For instance, the data storage device 100 may store the matrix descriptor in the first logical block address associated with the matrix.

Figure 5:
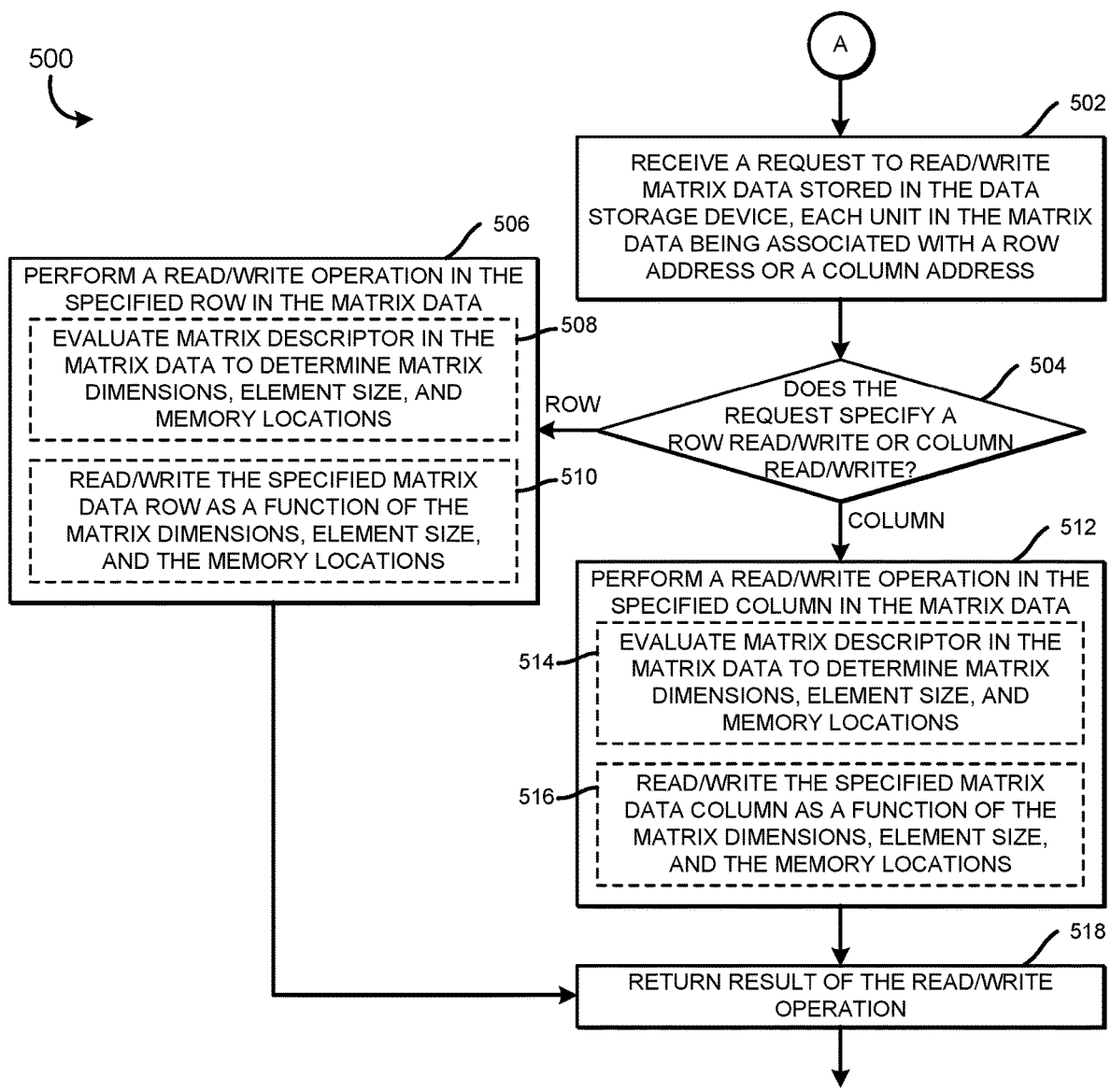
FIG. 5 is a simplified flow diagram of a method for performing a read or write operation to matrix data stored in the data storage device described relative to FIG. 1.

Referring now to FIG. 5, the data storage device 100, in operation, may perform a method 500 for performing a read or write operation to matrix data stored in the data storage device 100, such as one or more rows (or columns) of a matrix. As shown, the method 500 begins in block 502, in which the data storage device 100 receives a request to read or write matrix data stored in the data storage device 100 in which each memory unit is associated with a row-major or a column-major address. The request may specify whether the a read or a write operation is to be performed, a start memory address of the requested matrix, whether to perform a row-major or a column-major read or write operation, an offset in the row(s) or column(s) to read, and a total number of elements to read or write.

In block 504, the data storage device 100 determines whether the request specifies to perform a row-major or a column-major read or write operation. As stated, the request may include a flag indicating whether to perform a row-major or a column-major read or write operation. If the request is directed to a row-major read or write operation, then in block 506, the data storage device 100 performs the read or write operation in the specified row(s) in the matrix data. For instance, to do so, in block 508, the data storage device 100 may evaluate a matrix descriptor stored in the first location associated with the matrix to determine matrix dimensions, a size of elements, locations in which the matrix data is stored. In block 510, the data storage device 100 may then read or write the specified row(s) as a function of the matrix dimensions, size of elements, and the memory locations. If the size provided in the request is larger than the current row (e.g., requests specifying that the entire matrix be read by row), then the data storage device 100 can automatically read the data for the next row(s) by performing the read or write operations repeatedly. In block 518, the data storage device 100 can return the result of the read or write operation, such as an acknowledgement that the operation was completed.

Otherwise, if the request is directed to a column-major read or write operation, then in block 512, the data storage device 100 performs the read or write operation in the specified columns(s) in the matrix data. For instance, to do so, in block 514, the data storage device 100 may evaluate a matrix descriptor stored in the first location associated with the matrix to determine matrix dimensions, a size of elements, locations in which the matrix data is stored. In block 516, the data storage device 100 may then read or write the specified columns(s) as a function of the matrix dimensions, size of elements, and the memory locations. If the size provided in the request is larger than the current column (e.g., requests specifying that the entire matrix be read by column), then the data storage device 100 can automatically read the data for the next column(s) by performing the read or write operations repeatedly. In block 518, the data storage device 100 can return the result of the read or write operation, such as an acknowledgement that the operation was completed.

Figure 6:
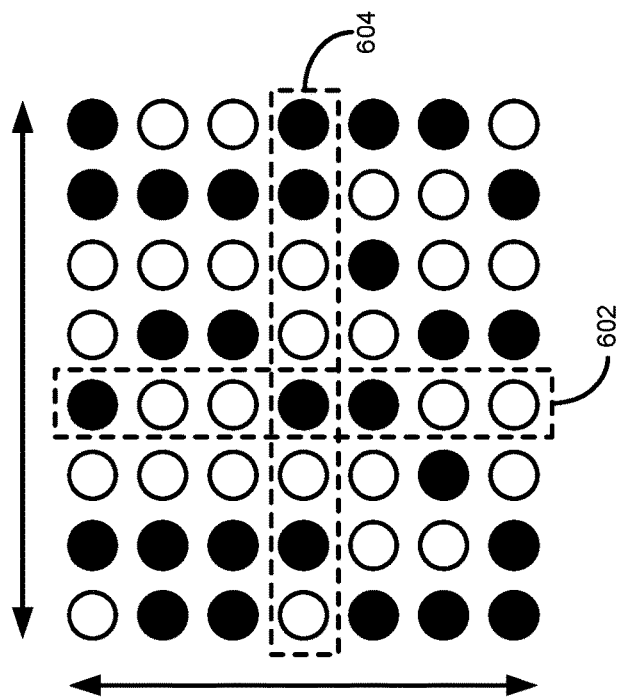
FIG. 6 is a simplified conceptual diagram of matrix data having row-major and column-major addressability that is stored in the data storage device described relative to FIG. 1.

Referring now to FIG. 6, a conceptual diagram of matrix data 600 is shown. As noted, the data storage device 100 may be representative of a 3D crosspoint memory-based storage device that, instead of using word-lines and bit-lines for page data, use bit-addressable memory units. In the matrix data 600, the memory units are represented as dots, in which black dots are indicative of matrix cells that are occupied and in which white dots are indicative of matrix cells that are unoccupied.

Illustratively, a column selection 602 is shown in which output from a read-out of the column selection 602 corresponds to data from each row in the matrix along the column. The output is indicative of portions of data for a page read from the data storage device 100. Further, a row selection 604 is shown in which output from a read-out of the row selection 604 corresponds to data from each column in the matrix along the row. The output is indicative of portions of data for a page read from the data storage device 100. Advantageously, embodiments presented herein allow data to be read directly in either row-major or column major format.

EXAMPLES

Illustrative examples of the technologies disclosed herein are provided below. An embodiment of the technologies may include any one or more, and any combination of, the examples described below.

Example 1 includes an apparatus comprising a memory comprising a plurality of memory units; and a controller to receive a request to perform a read or write operation on matrix data stored in one or more of the plurality of memory units, each memory unit associated with a column address; determine whether the request specifies to read or write a column or a row in the matrix data; and perform, in response to a determination that the request specifies to read or write a column in the matrix data, the read or write operation on the matrix data on the column.

Example 2 includes the subject matter of Example 1, and wherein to receive the request to perform the read or write operation on the matrix data comprises to receive the request to perform the read or write operation on the matrix data, the matrix data including a matrix descriptor having at least one of matrix dimensions, a size of elements in the matrix data, or locations of the memory units in which the matrix data is stored.

Example 3 includes the subject matter of any of Examples 1 and 2, and wherein to perform the read or write operation on the matrix data on the column comprises to evaluate the matrix descriptor to determine the matrix dimensions, the size of the elements in the matrix data, and the locations of the memory units; and read or write the column as a function of the matrix dimensions, the size of the elements in the matrix data, and the locations of the memory units.

Example 4 includes the subject matter of any of Examples 1-3, and wherein the controller is further to return the result of the read or write operation.

Example 5 includes the subject matter of any of Examples 1-4, and wherein to receive the request to perform a read or write operation on the matrix data comprises to receive the request to perform a read or write operation on the matrix data stored in the one or more of the plurality of memory units, each memory unit associated with a row address.

Example 6 includes the subject matter of any of Examples 1-5, and wherein the controller is further to perform, in response to a determination that the request specifies to read or write a row in the matrix data, the read or write operation on the matrix data on the row.

Example 7 includes the subject matter of any of Examples 1-6, and wherein to perform the read or write operation on the matrix data on the row comprises to evaluate a matrix descriptor in the matrix data to determine matrix dimensions, a size of elements in the matrix data, and locations of the memory units in which the matrix data is stored; and read or write the row as a function of the matrix dimensions, the size of the elements in the matrix data, and the locations of the memory units.

Example 8 includes the subject matter of any of Examples 1-7, and wherein the controller is further to receive a request to initialize the matrix data, the request to initialize the matrix data including a specification of matrix dimensions of the matrix data, a size of elements of the matrix data, and a preference to store the matrix data according to row major or column major.

Example 9 includes the subject matter of any of Examples 1-8, and wherein the controller is further to generate a matrix descriptor that is indicative of the specification of the matrix dimensions of the matrix data, the size of elements of the matrix data, and the preference to store the matrix data according to row major or column major; and write the matrix data to the one or more of the plurality of memory units.

Example 10 includes the subject matter of any of Examples 1-9, and wherein to write the matrix data to the one or more of the plurality of memory units comprises to initialize the one or more of the plurality of memory units to store the matrix data; update the matrix descriptor to include locations indicative of the one or more of the plurality of memory units; and store the matrix descriptor in one of the plurality of memory units.

Example 11 includes a compute device comprising a data storage device having a memory including a plurality of memory units and a data storage controller to receive a request to perform a read or write operation on matrix data stored in one or more of the plurality of memory units, each memory unit associated with a column address; determine whether the request specifies to read or write a column or a row in the matrix data; and perform, in response to a determination that the request specifies to read or write a column in the matrix data, the read or write operation on the matrix data on the column.

Example 12 includes the subject matter of Example 11, and wherein to receive the request to perform the read or write operation on the matrix data comprises to receive the request to perform the read or write operation on the matrix data, the matrix data including a matrix descriptor having at least one of matrix dimensions, a size of elements in the matrix data, or locations of the memory units in which the matrix data is stored.

Example 13 includes the subject matter of any of Examples 11 and 12, and wherein to perform the read or write operation on the matrix data on the column comprises to evaluate the matrix descriptor to determine the matrix dimensions, the size of the elements in the matrix data, and the locations of the memory units; and read or write the column as a function of the matrix dimensions, the size of the elements in the matrix data, and the locations of the memory units.

Example 14 includes the subject matter of any of Examples 11-13, and wherein the data storage controller is further to return the result of the read or write operation.

Example 15 includes the subject matter of any of Examples 11-14, and wherein to receive the request to perform a read or write operation on the matrix data comprises to receive the request to perform a read or write operation on the matrix data stored in the one or more of the plurality of memory units, each memory unit associated with a row address.

Example 16 includes the subject matter of any of Examples 11-15, and wherein the data storage controller is further to perform, in response to a determination that the request specifies to read or write a row in the matrix data, the read or write operation on the matrix data on the row.

Example 17 includes the subject matter of any of Examples 11-16, and wherein to perform the read or write operation on the matrix data on the row comprises to evaluate a matrix descriptor in the matrix data to determine matrix dimensions, a size of elements in the matrix data, and locations of the memory units in which the matrix data is stored; and read or write the row as a function of the matrix dimensions, the size of the elements in the matrix data, and the locations of the memory units.

Example 18 includes the subject matter of any of Examples 11-17, and wherein the data storage controller is further to receive a request to initialize the matrix data, the request to initialize the matrix data including a specification of matrix dimensions of the matrix data, a size of elements of the matrix data, and a preference to store the matrix data according to row major or column major.

Example 19 includes the subject matter of any of Examples 11-18, and wherein the data storage controller is further to generate a matrix descriptor that is indicative of the specification of the matrix dimensions of the matrix data, the size of elements of the matrix data, and the preference to store the matrix data according to row major or column major; initialize the one or more of the plurality of memory units to store the matrix data; update the matrix descriptor to include locations indicative of the one or more of the plurality of memory units; and store the matrix descriptor in one of the plurality of memory units.

Example 20 includes a data storage device comprising circuitry for receiving a request to perform a read or write operation on matrix data stored in one or more of a plurality of memory units, each memory unit associated with a column address; means for determining whether the request specifies to read or write a column or a row in the matrix data; and means for performing, in response to a determination that the request specifies to read or write a column in the matrix data, the read or write operation on the matrix data on the column.

The invention claimed is:
1. An apparatus comprising:
 a memory comprising a plurality of bit-addressable memory units, each memory unit associated with a row address and a column address; and
 a controller to:
  receive a memory access request from a processor to perform a read or write operation on matrix data stored in one or more of the plurality of memory units, the memory access request to indicate a start address of the matrix data;

determine, with decoder circuitry, whether the matrix data is stored in row-major or column-major format based on a matrix descriptor;

determine, with the decoder circuitry, whether to perform a row-major memory read or write operation or a column-major memory read or write operation based on whether the matrix data is stored in row-major or column-major format and based on a row-major or a column-major flag in the memory access request that is indicative of whether to perform a row-major or a column-major readout of the matrix data;

in response to a determination to perform a row-major memory read or write operation, perform the read or write operation along memory rows specified by the memory access request; and in response to a determination to perform a column-major memory read or write operation, perform the read or write operation along memory columns specified by the memory access request.

2. The apparatus of claim 1, wherein to receive the memory access request comprises: to receive the memory access request to perform the read or write operation on the matrix data, the matrix data including the matrix descriptor having at least one of matrix dimensions, a size of elements in the matrix data, or locations of memory units in which the matrix data is stored.

3. The apparatus of claim 1, wherein the controller is further to return a result of the read or write operation.

4. The apparatus of claim 1, wherein the controller is further to receive a request to initialize the matrix data, the request to initialize the matrix data including a specification of matrix dimensions of the matrix data, a size of elements of the matrix data, and a preference to store the matrix data according to row major or column major.

5. The apparatus of claim 4, wherein the controller is further to:

generate a matrix descriptor that is indicative of the specification of the matrix dimensions of the matrix data, the size of elements of the matrix data, and the preference to store the matrix data according to row major or column major; and write the matrix data to the one or more of the plurality of memory units.

6. The apparatus of claim 5, wherein to write the matrix data to the one or more of the plurality of memory units comprises to:

initialize the one or more of the plurality of memory units to store the matrix data;

update the matrix descriptor to include locations indicative of the one or more of the plurality of memory units; and store the matrix descriptor in one of the plurality of memory units.

7. The apparatus of claim 1, wherein:

The controller is to:

receive a first memory access request to write the matrix data with row-major format;

write to multiple column addresses at the row address;

receive a second memory access request to read the matrix data with column-major format; and read from multiple row addresses at the column address.

8. The apparatus of claim 1, wherein:

the memory comprises cross-point memory.

9. A compute device comprising:

a data storage device having a memory including a plurality of bit-addressable memory units and a data storage controller to:

receive a memory access request from a processor to perform a read or write operation on matrix data stored in one or more of the plurality of memory units, the memory access request to indicate a start address of the matrix data;

determine, with decoder circuitry, whether the matrix data is stored in row-major or column-major format based on a matrix descriptor;

determine, with the decoder circuitry, whether to perform a row-major memory read or write operation or a column-major memory read or write operation based on whether the matrix data is stored in row-major or column-major format and based on a row-major or a column-major flag in the memory access request that is indicative of whether to perform a row-major or a column-major readout of the matrix data;

in response to a determination to perform a row-major memory read or write operation, perform the read or write operation along memory rows specified by the memory access request; and in response to a determination to perform a column-major memory read or write operation, perform the read or write operation along memory columns specified by the memory access request.

10. The compute device of claim 9, wherein to receive the memory access request comprises: to receive the memory access request to perform the read or write operation on the matrix data, the matrix data including the matrix descriptor having at least one of matrix dimensions, a size of elements in the matrix data, or locations of memory units in which the matrix data is stored.

11. The compute device of claim 9, wherein the data storage controller is further to return a result of the read or write operation.

12. The compute device of claim 9, wherein the data storage controller is further to receive a request to initialize the matrix data, the request to initialize the matrix data including a specification of matrix dimensions of the matrix data, a size of elements of the matrix data, and a preference to store the matrix data according to row major or column major.

13. The compute device of claim 12, wherein the data storage controller is further to:

generate a matrix descriptor that is indicative of the specification of the matrix dimensions of the matrix data, the size of elements of the matrix data, and the preference to store the matrix data according to row major or column major;

initialize the one or more of the plurality of memory units to store the matrix data;

update the matrix descriptor to include locations indicative of the one or more of the plurality of memory units; and store the matrix descriptor in one of the plurality of memory units.

14. The compute device of claim 9, wherein:

data storage controller is to:

receive a first memory access request to write the matrix data with row-major format;

write to multiple column addresses at a row address;

receive a second memory access request to read the matrix data with column-major format; and read from multiple row addresses at a column address.

15. The compute device of claim 9, wherein:
the memory comprises cross-point memory.

16. A method comprising:
receiving a memory access request from a processor to perform a read or write operation on matrix data stored in one or more of a plurality of bit-addressable memory units, the memory access request to indicate a start address of the matrix data;
determining, with decoder circuitry, whether the matrix data is stored in row-major or column-major format based on a matrix descriptor;
determining, with the decoder circuitry, whether to perform a row-major memory read or write operation or a column-major memory read or write operation based on whether the matrix data is stored in row-major or column-major format and based on a row-major or a column-major flag in the memory access request that is indicative of whether to perform a row-major or a column-major readout of the matrix data;
in response to a determination to perform a row-major memory read or write operation, perform the read or write operation along memory rows specified by the memory access request; and
in response to a determination to perform a column-major memory read or write operation, perform the read or write operation along memory columns specified by the memory access request.

17. The method of claim 16, wherein to receive the memory access request comprises: to receive the memory access request to perform the read or write operation on the matrix data, the matrix data including the matrix descriptor having at least one of matrix dimensions, a size of elements in the matrix data, or locations of memory units in which the matrix data is stored.

18. The method of claim 16, further comprising:
receiving a first memory access request to write the matrix data with row-major format;
writing to multiple column addresses at a row address;
receiving a second memory access request to read the matrix data with column-major format; and
reading from multiple row addresses at a column address.

* * * * *